Dec. 5, 1950 P. PIERCE, JR 2,533,177
EJECTOR FOR WRAPPING MACHINES
Filed Oct. 10, 1946 2 Sheets-Sheet 2
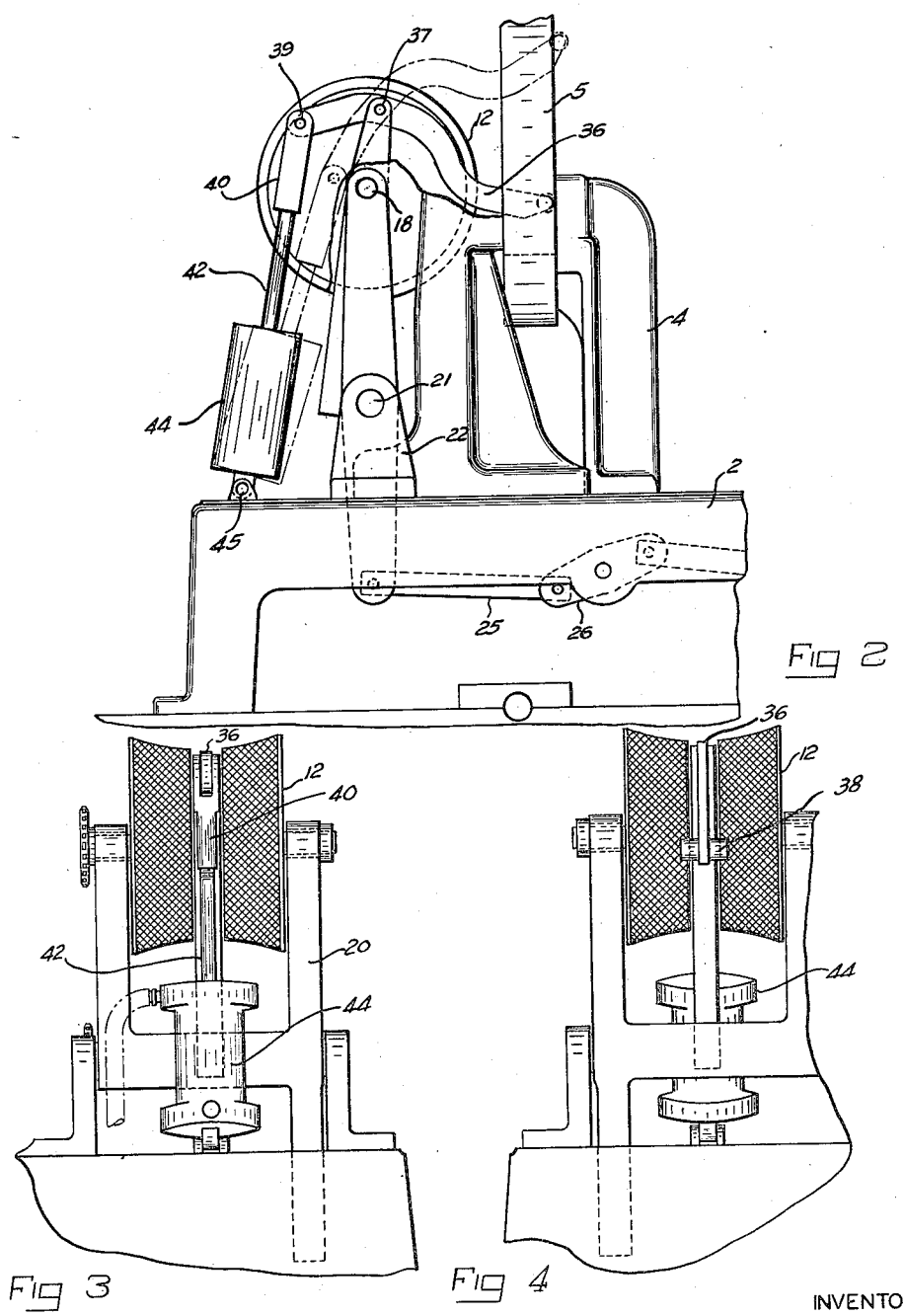
INVENTOR
PAUL PIERCE JR.
BY Ely & Frye
ATTORNEYS Patented Dec. 5, 1950

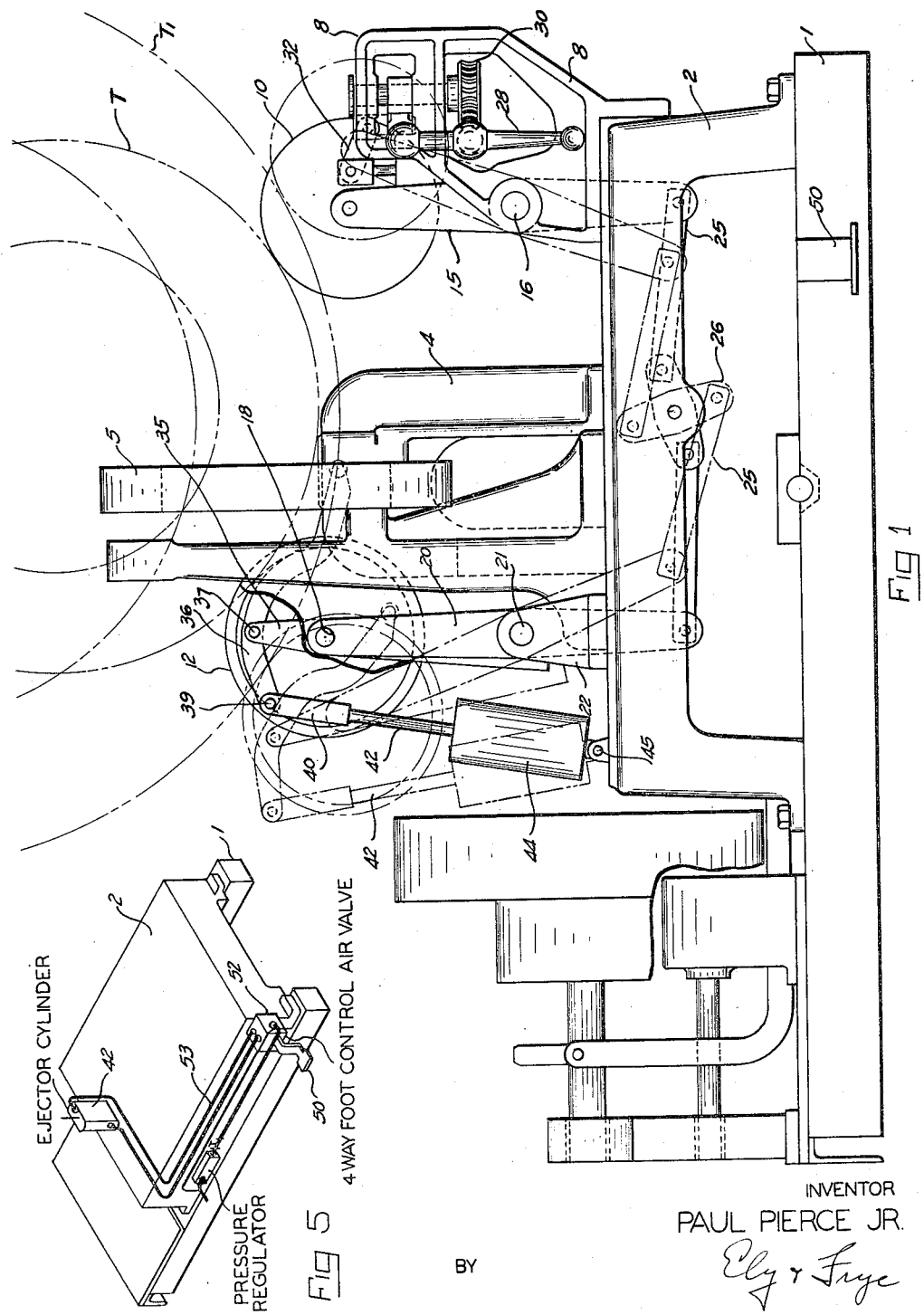

2,533,177

UNITED STATES PATENT OFFICE 2,533,177

EJECTOR FOR WRAPPING MACHINES

Paul Pierce, Jr., La Grange, Ill., assignor to Pierce Wrapping Machine Company, Chicago, Ill., a corporation of Illinois Application October 10, 1946, Serial No. 702,430

9 Claims. (Cl. 242—6)

1

This invention has as its object the provision of means by which an annular article may be ejected from a wrapping machine at the conclusion of the wrapping operation. The specific adaptation of the invention is in conjunction with machines for wrapping automobile tires, although the invention is not restricted to that limited field and may be employed in machines for wrapping coils of wire, hose or the like.

Machines for wrapping automobile tires are well known in the art and the invention is shown as applied to and embodied in a standard machine for the purpose. In these machines the tire is supported in upright position with its periphery resting upon two rolls or drums which are rotated to propel the tire in one plane while a shuttle rotating in a transverse plane applies the wrapping about the tire. After the tire is wrapped, the operator rolls it out of the machine. As the tire is cradled on the drums, the removal of the tire requires considerable effort, especially in the case of large, heavy tires such as are now more commonly produced. The invention provides an ejector which acts upon the tire to raise it to a position in which it rests upon one drum only and is overbalanced so that it rolls by gravity out of the machine.

A tire wrapping machine is usually intended to wrap varying sizes of tires, and for this purpose the tire supporting drums are organized so that they may be caused to approach or recede so that any size tire within the range for which the machine is adapted may be located at the axis of the shuttle. The ejecting mechanism shown herein is so designed that it will shift as the drums are adjusted and thereby be located when idle below the periphery of the tire in any position of drum adjustment.

In the specific form of the invention shown herein, the ejector is designed to be foot-operated, but this is not essential. Other details of the mechanism may be altered or modified, it being the intent to illustrate the best known and preferred form of the invention without limiting it to the details set forth. In the drawings many of the details of the standard wrapping machine have been omitted as they have no bearing upon the inventive features of the case and are well known to those familiar with this art.

In the drawings:

Fig. 1 is a side elevation of a wrapping machine equipped with the improved ejecting device. In this view the drums are shown in two positions to accommodate a large or a small size tire. In

2 this view the left hand drum is partially broken away to show the ejector.

Fig. 2 is a view showing the movement of the ejector in discharging the wrapped tire.

Fig. 3 is a rear elevation of the drum which carries the ejector.

Fig. 4 is an elevation thereof taken in the opposite direction from Fig. 3.

Fig. 5 is a perspective view showing the piping for actuating the ejector.

The machine shown herein as illustrative of the invention is mounted upon a base 1 upon which is carried the main bed plate of the machine, indicated at 2. Near the center of the bed plate is a standard 4 upon which is mounted the supporting means for the rotating shuttle indicated in outline at 5. At the right hand or forward end of the bed plate is a housing 8 which supports one drum indicated at 10. The drum 10 is usually cylindrical, while the other drum 12 is preferably dished or concave to hold and guide the tire in upright position. These drums are driven by mechanism not shown so as to rotate the tire at a relatively slow speed while the shuttle is revolved at high speed to apply the wrapping about the tire.

The drum 10 is rotatably mounted on the upper end of an arm 15 pivoted at 16 in the housing 8. The drum 12 is rotatably mounted on a shaft 18 on the upper end of an arm 20 pivoted at 21 in the bracket 22 attached to the bed plate 2. The lower ends of the arms 15 and 20 are connected by links 25 to opposite ends of a center link 26 pivoted in the bed plate so that the arms will move in unison toward and from each other in adjusting the machine. The adjustment of the drums is done by a hand crank 28 mounted on the housing 8 and driving a worm gear 30, the shaft of which is connected, as at 32, to the arm 15 so that rotation of the crank will rock both arms.

In the full line position shown in Fig. 1, the drums are adjusted to receive a small tire T and in this position are relatively close together so that the lowest point on the tire is just below the points of tangency of the tire and the drums. For a large tire T', the drums are lowered and spread further apart, which drops the lowermost point of the tire. This condition makes it necessary to shift the idle position of the ejector as the machine is adjusted for different sizes of tires.

As shown more clearly in Figs. 3 and 4, the drum 12 is split or divided on the shaft 18 so that a substantial space is provided at the center of the drum to accommodate the ejector. This comprises a long, vertical arm 35 which is pivoted near its upper end of the shaft 18 so that the lower part of the arm acts as a counterweight for the ejector. The ejector is a relatively long, reversely curved arm 36 which is pivoted at 37 to the upper end of the arm 35 so that the main body of the ejector lies between the two sections of the drum 12. The forward end of the ejector arm extends beyond the drum and terminates near the lowermost point of the tire as it is cradled on the drums, but always somewhat below the tire. At this point a roller or pin 38 is carried by the ejector.

The rear end of the ejector arm 36 is pivotally connected at 39 to a fork 40 which is threaded on the upper end of a piston 42, the head of which is received in a cylinder 44 pivoted at 45 on the bed plate 2. When the piston is at the upper end of its travel, the forward end of the ejector is in idle position below the tire, but when the piston is lowered in the cylinder, the ejector is raised and the tire is elevated so that it is lifted to a position where it is sufficiently overbalanced so that it will roll backwardly off the drum 12 and thus be discharged from the machine. Two typical extreme positions of the ejector are shown in Fig. 2.

By reference to Fig. 1, it will be observed that as the arm 20 is moved about the pivot 21 in adjusting the machine for varying sizes of tires, the fork 40, cylinder 44 and piston 42 jointly act as a link which is likewise moved and causes the point 39 to shift and this causes the outer end of the ejector arm to rise or fall depending upon whether the machine setting is being made for a large or small tire. This action insures that the forward end of the ejector arm will always lie well below the lowermost point of the tire but in position so that when the piston is actuated the ejector will raise the tire sufficiently to cause it to roll by gravity out of the machine. It will thus be seen that the machine is organized so that in any position of adjustment the ejector arm will not interfere with the wrapping of the tire and will always function properly at the conclusion of the wrapping operation.

It is preferred to operate the ejector by a foot treadle so that the operator's hands may be free. A foot treadle for the purpose is illustrated at 50. This operates a valve 52 which, through piping 53 shown in Fig. 5, actuates the piston in the cylinder 44.

The above description in connection with the drawings shows the preferred mechanism for achieving the purposes of the invention, but it will be understood that the specific embodiment may be altered or modified without departing from the essential featurees of the invention as set forth in the appended claims.

What is claimed is:

1. In a machine for wrapping tires, a pair of drums for supporting a tire in upright position, means to adjust the space between the drums for varying sizes of tires, an ejector located between the drums and means connected to the ejector and operable as the drums are adjusted so that the ejector always lies below the lowermost point on the tire, and means to raise the ejector to lift the tire from its position on the drums.

2. In a machine for wrapping tires, a pair of drums for supporting a tire in upright position, means to adjust the space between the drums for varying sizes of tires, an ejector located between the drums and means connected to the ejector and operable as the drums are adjusted so that the ejector always lies below the lowermost point on the tire, and means to raise the ejector to lift the tire from its position where it rests upon both said drums to a position where it rests upon one drum only in unbalanced condition.

3. In a tire wrapping machine, a pair of drums for supporting a tire in upright position, means to adjust the space between the drums to accommodate varying sizes of tires, an arm pivotally mounted at the axis of one of said drums and having one end lying between the drums and below the tire, and means to rock the arm to move the tire from its position on both drums to a position where it is unbalanced on one of said drums and will roll out of the machine.

4. In a machine for wrapping annular articles, a pair of drums to support the article in upright position, a movable support for one of said drums whereby it may be spaced at different distances from the other drum, an ejector arm pivotally mounted on the support and having one end located between the drums and below the surface of an article thereon, means to rock the arm concurrently with the movement of the support, and means to raise the arm to lift the article from a position where it rests upon both drums.

5. In a machine for wrapping annular articles, a pair of drums to support the article in upright position, a movable support for one of said drums whereby it may be spaced at different distances from the other drum, an ejector arm pivotally mounted on the support and having one end located between the drums and below the surface of an article thereon, means to rock the arm concurrently with the movement of the support, and means to raise the arm to lift the article from a position where it rests upon both drums to a position where it rests upon one drum only and its weight is overbalanced so that the article may roll by gravity out of the machine.

6. In a machine for wrapping tires or other annular articles, a pair of drums on which the article is supported in upright position by its outer periphery during the wrapping operation, means to adjust the spacing between the drums to accommodate articles of varying diameters, and means movable from a position below the periphery of the article to a position above both drums, said means also being movable as the drums are adjusted so that it always lies below the article while the latter is on both drums.

7. A machine for wrapping tires comprising a pair of rotatable drums for supporting the tire in upright position for wrapping with its periphery resting on both said drums, a rocking arm for supporting one of said drums, a shaft in said arm on which said drum is rotatable, a pivoted arm mounted on said shaft, an ejector arm pivoted on the second named arm, one end of said ejector arm being located between the drums and below the lowermost point of the tire, and a link connected to the other end of said ejector arm to rock the ejector arm as said rocking arm is moved.

8. A machine for wrapping tires comprising a pair of rotatable drums for supporting the tire in upright position for wrapping with its periphery resting on both said drums, a rocking arm for supporting one of said drums, a shaft in said arm on which said drum is rotatable, a pivoted arm mounted on said shaft, an ejector arm pivoted on the second named arm, one end of said ejector arm being located between the drums and below the lowermost point of the tire, a link connected to the other end of said ejector arm to rock the ejector arm as said rocking arm is moved, and means to contract the link to move the other end of the ejector arm above the drums.

9. A machine for wrapping tires comprising a pair of rotatable drums for supporting the tire in upright position for wrapping with its periphery resting on both said drums, a rocking arm for supporting one of said drums, a shaft in said arm on which said drum is rotatable, a pivoted arm mounted on said shaft, an ejector arm pivoted on the second named arm, one end of said ejector arm being located between the drums and below the lowermost point of the tire, a link connected to the other end of said ejector arm to rock the ejector arm as said rocking arm is moved, and means to contract the link to move the other end of the ejector arm above the drums to a position where the tire rests upon one drum only in unbalanced condition.

PAUL PIERCE, Jr.

REFERENCES CITED

The following references are of record in the file of this patent:

UNITED STATES PATENTS

| Number | Name | Date |
|---|---|---|
| 1,263,923 | Pierce | Apr. 23, 1918 |
| 1,351,809 | Sutherland | Sept. 20, 1920 |
| 1,764,081 | Jones et al. | June 17, 1930 |
| 1,777,089 | Jansen | Sept. 30, 1930 |
| 1,904,255 | Seeley | Apr. 18, 1933 |
| 2,385,321 | Miller | Sept. 18, 1945 |